US012115782B2

(12) United States Patent
Landa et al.

(10) Patent No.: US 12,115,782 B2
(45) Date of Patent: Oct. 15, 2024

(54) ENDLESS FLEXIBLE BELT FOR A PRINTING SYSTEM

(71) Applicant: LANDA CORPORATION LTD., Rehovot (IL)

(72) Inventors: Benzion Landa, Nes Ziona (IL); Sagi Abramovich, Ra'anana (IL); Aharon Shmaiser, Rishon LeZion (IL); Rami Keller, Tel Aviv (IL); Itshak Ashkanazi, Rehovot (IL)

(73) Assignee: LANDA CORPORATION LTD., Rehovot (IL)

( * ) Notice: Subject to any disclaimer, the term of this patent is extended or adjusted under 35 U.S.C. 154(b) by 111 days.

(21) Appl. No.: 17/676,398

(22) Filed: Feb. 21, 2022

(65) Prior Publication Data

US 2022/0339927 A1 Oct. 27, 2022

Related U.S. Application Data

(63) Continuation of application No. 17/014,525, filed on Sep. 8, 2020, now Pat. No. 11,285,715, which is a continuation of application No. 16/714,756, filed on Dec. 15, 2019, now Pat. No. 10,828,888, which is a continuation of application No. 16/219,582, filed on (Continued)

(51) Int. Cl.
*B41J 11/00* (2006.01)
*B41J 2/005* (2006.01)

(52) U.S. Cl.
CPC .. *B41J 2/0057* (2013.01); *G03G 2215/00147* (2013.01); *G03G 2215/00151* (2013.01)

(58) Field of Classification Search
CPC . B41J 11/007; B41J 2/0057; B41J 1/30; B41J 2/22; B41J 2/315; B41J 2/435; B41J 17/28; B41J 17/30; B41J 17/32; G03G 2215/00147; G03G 2215/00151; B65H 5/02
See application file for complete search history.

(56) References Cited

U.S. PATENT DOCUMENTS 3,833,923 A 9/1974 Galus et al.
3,837,878 A 9/1974 Beers
(Continued)

FOREIGN PATENT DOCUMENTS

CN 1305895 A 8/2001
CN 1543404 A 11/2004
(Continued)

OTHER PUBLICATIONS

CN101592896A Machine Translation (by EPO and Google)—published Dec. 2, 2009; Canon KK.
(Continued)

*Primary Examiner* — Scott A Richmond
(74) *Attorney, Agent, or Firm* — Momentum IP; Marc Van Dyke

(57) ABSTRACT

A flexible belt is disclosed for use in a printing system. The belt comprises an endless strip which, in use, travels along a continuous path. Formations are provided along the sides of the strip which are capable of engaging with lateral tracks to place the belt under lateral tension, the lateral tracks further serving to constrain the belt to follow the continuous path.

6 Claims, 8 Drawing Sheets

Related U.S. Application Data

Dec. 13, 2018, now Pat. No. 10,569,533, which is a continuation of application No. 15/790,026, filed on Oct. 22, 2017, now Pat. No. 10,201,968, which is a continuation of application No. 15/345,238, filed on Nov. 7, 2016, now Pat. No. 9,849,667, which is a continuation of application No. 14/382,759, filed as application No. PCT/IB2013/051719 on Mar. 5, 2013, now Pat. No. 9,517,618.

(60) Provisional application No. 61/635,180, filed on Apr. 18, 2012, provisional application No. 61/611,505, filed on Mar. 15, 2012, provisional application No. 61/611,497, filed on Mar. 15, 2012.

(56) References Cited

U.S. PATENT DOCUMENTS

| | | | |
|---|---|---|---|
| 3,935,055 | A | 1/1976 | Carmien |
| 4,204,471 | A | 5/1980 | Becker |
| 4,520,048 | A | 5/1985 | Ranger |
| 4,792,473 | A | 12/1988 | Mtale |
| 4,867,830 | A | 9/1989 | Chung |
| 4,889,576 | A | 12/1989 | Suganuma et al. |
| 5,278,199 | A | 1/1994 | Ohkawa et al. |
| 5,320,214 | A | 6/1994 | Kordis |
| 5,683,841 | A | 11/1997 | Kato |
| 5,757,390 | A | 5/1998 | Gragg et al. |
| 5,865,299 | A | 2/1999 | Williams |
| 5,904,096 | A | 5/1999 | Fawcett et al. |
| 6,318,853 | B1 | 11/2001 | Asano et al. |
| 6,335,046 | B1 | 1/2002 | Mackey |
| 6,405,006 | B1 * | 6/2002 | Tabuchi ............. G03G 15/0208 399/176 |
| 6,974,022 | B2 * | 12/2005 | Saeki ..................... B65G 15/46 198/831 |
| 7,604,112 | B1 * | 10/2009 | Lee ........................ B65G 15/02 198/831 |
| 9,517,618 | B2 | 12/2016 | Landa et al. |
| 9,849,667 | B2 | 12/2017 | Landa et al. |
| 10,201,968 | B2 | 2/2019 | Landa et al. |
| 10,569,533 | B2 | 2/2020 | Landa et al. |
| 10,703,093 | B2 | 7/2020 | Karlinski et al. |
| 10,828,888 | B2 | 11/2020 | Landa et al. |
| 11,285,715 | B2 | 3/2022 | Landa et al. |
| 2001/0033688 | A1 | 10/2001 | Taylor |
| 2002/0014299 | A1 | 2/2002 | Dolan et al. |
| 2002/0061451 | A1 | 5/2002 | Kita et al. |
| 2002/0157786 | A1 | 10/2002 | Tarnawskyj et al. |
| 2003/0103126 | A1 | 6/2003 | Pham |
| 2003/0103128 | A1 | 6/2003 | Missell et al. |
| 2003/0210151 | A1 | 11/2003 | Kimberlain et al. |
| 2003/0221773 | A1 | 12/2003 | Jones |
| 2004/0105971 | A1 | 6/2004 | Parrinello et al. |
| 2004/0177779 | A1 | 9/2004 | Steffen et al. |
| 2004/0221943 | A1 | 11/2004 | Yu et al. |
| 2004/0249327 | A1 | 12/2004 | Sendijarevic et al. |
| 2004/0265016 | A1 | 12/2004 | Kitani et al. |
| 2005/0103437 | A1 | 5/2005 | Carroll |
| 2005/0117859 | A1 | 6/2005 | Suzuki et al. |
| 2006/0066704 | A1 | 3/2006 | Nishida |
| 2006/0120740 | A1 | 6/2006 | Yamada et al. |
| 2007/0025740 | A1 | 2/2007 | Katoh et al. |
| 2008/0066277 | A1 | 3/2008 | Colson et al. |
| 2008/0247780 | A1 | 10/2008 | Hara |
| 2009/0073222 | A1 | 3/2009 | Hori |
| 2009/0185204 | A1 | 7/2009 | Wu et al. |
| 2010/0035501 | A1 | 2/2010 | Prudhomme et al. |
| 2010/0123752 | A1 | 5/2010 | Eun et al. |
| 2010/0247171 | A1 | 9/2010 | Ono et al. |
| 2011/0069129 | A1 | 3/2011 | Shimizu |
| 2011/0298884 | A1 | 12/2011 | Furuta |
| 2012/0014726 | A1 | 1/2012 | Sekihara et al. |
| 2012/0236100 | A1 | 9/2012 | Toya |
| 2012/0249630 | A1 | 10/2012 | Bugner et al. |
| 2013/0096871 | A1 | 4/2013 | Takahama |
| 2013/0229457 | A1 | 9/2013 | Yu |
| 2013/0235139 | A1 | 9/2013 | Schnabel et al. |
| 2014/0168313 | A1 | 6/2014 | Ramesh et al. |
| 2014/0176641 | A1 | 6/2014 | Hawryschuk et al. |
| 2014/0262008 | A1 | 9/2014 | Balaji et al. |
| 2015/0273835 | A1 | 10/2015 | Arimizu et al. |
| 2015/0343797 | A1 | 12/2015 | Song et al. |
| 2015/0375474 | A1 | 12/2015 | DeGolier et al. |
| 2015/0375543 | A1 | 12/2015 | Barnett et al. |
| 2016/0083609 | A1 | 3/2016 | Sisler et al. |
| 2016/0274519 | A1 | 9/2016 | Lim et al. |
| 2016/0378036 | A1 | 12/2016 | Onishi et al. |
| 2017/0282599 | A1 | 10/2017 | Ido |
| 2018/0149998 | A1 | 5/2018 | Furukawa |
| 2018/0201005 | A1 | 7/2018 | Park |
| 2020/0073301 | A1 | 3/2020 | Sakai et al. |
| 2020/0361715 | A1 | 11/2020 | Meier |
| 2021/0055666 | A1 | 2/2021 | Landa et al. |
| 2022/0153015 | A1 | 5/2022 | Landa et al. |
| 2022/0153048 | A1 | 5/2022 | Landa et al. |
| 2022/0176693 | A1 | 6/2022 | Landa et al. |
| 2022/0188050 | A1 | 6/2022 | Levant |
| 2022/0379598 | A1 | 12/2022 | Landa et al. |
| 2022/0388315 | A1 | 12/2022 | Landa et al. |
| 2023/0001710 | A1 | 1/2023 | Landa et al. |
| 2023/0016492 | A1 | 1/2023 | Landa et al. |
| 2023/0037462 | A1 | 2/2023 | Burkatovsky |

FOREIGN PATENT DOCUMENTS

| | | | |
|---|---|---|---|
| CN | 1703326 | A | 11/2005 |
| CN | 1961015 | A | 5/2007 |
| CN | 101096455 | A | 1/2008 |
| CN | 101248146 | A | 8/2008 |
| CN | 101592896 | A | 12/2009 |
| CN | 101820241 | A | 9/2010 |
| CN | 102341249 | A | 2/2012 |
| CN | 102529257 | A | 7/2012 |
| CN | 102673209 | A | 9/2012 |
| CN | 104015415 | A | 9/2014 |
| CN | 107879147 | A | 4/2018 |
| EP | 0953450 | A1 | 11/1999 |
| JP | 48043941 | | 12/1973 |
| JP | S63274572 | A | 11/1988 |
| JP | H05249870 | A | 9/1993 |
| JP | H08245032 | A | 9/1996 |
| JP | H09174646 | A | 7/1997 |
| JP | H10130597 | A | 5/1998 |
| JP | 2000094660 | A | 4/2000 |
| JP | 2000141883 | A | 5/2000 |
| JP | 2000190468 | A | 7/2000 |
| JP | 2000337464 | A | 12/2000 |
| JP | 2003076159 | A | 3/2003 |
| JP | 2003227549 | A | 8/2003 |
| JP | 2004117118 | A | 4/2004 |
| JP | 2005224737 | A | 8/2005 |
| JP | 2006256087 | A | 9/2006 |
| JP | 2008082820 | A | 4/2008 |
| JP | 2009154377 | A | 7/2009 |
| JP | 2009227909 | A | 10/2009 |
| JP | 2009240925 | A | 10/2009 |
| JP | 2009271422 | A | 11/2009 |
| JP | 2009279808 | A | 12/2009 |
| JP | 2011168024 | A | 9/2011 |
| JP | 2013104044 | A | 5/2013 |
| JP | 2014008609 | A | 1/2014 |
| JP | 2014073675 | A | 4/2014 |
| JP | 2015202616 | A | 11/2015 |
| JP | 2016074206 | A | 5/2016 |
| JP | 2016179678 | A | 10/2016 |
| JP | 2016183049 | A | 10/2016 |
| JP | 2017093178 | A | 5/2017 |
| JP | 2018017429 | A | 2/2018 |
| JP | 2020014350 | A | 1/2020 |

(56) References Cited

FOREIGN PATENT DOCUMENTS

| | | | |
|---|---|---|---|
| WO | 2015026864 | A1 | 2/2015 |
| WO | 2017208152 | A1 | 12/2017 |

OTHER PUBLICATIONS

CN101820241A Machine Translation (by EPO and Google)—published Sep. 1, 2010; Canon KK.
CN102529257A Machine Translation (by EPO and Google)—published Jul. 4, 2012; Nippon Synthetic Chem Ind.
CN102673209A Machine Translation (by EPO and Google)—published Sep. 19, 2012; Wistron Corp.
CN104015415A Machine Translation (by EPO and Google)—published Sep. 3, 2014; Avery Dennison Corp.
CN1305895A Machine Translation (by EPO and Google)—published Aug. 1, 2001; IMAJE SA [FR].
CN1543404A Machine Translation (by EPO and Google)—published Nov. 3, 2004; 3M Innovative Properties Co [US].
CN1703326A Machine Translation (by EPO and Google)—published Nov. 30, 2005; Nissha Printing [JP].
Co-pending U.S. Appl. No. 17/583,372, inventor Pomerantz; Uriel, filed Jan. 25, 2022.
Co-pending U.S. Appl. No. 17/694,702, inventor Chechik; Helena, filed Mar. 15, 2022.
Co-pending U.S. Appl. No. 17/712, 198, filed Apr. 4, 2022.
JP2003076159A Machine Translation (by EPO and Google)—published Mar. 14, 2003, Ricoh KK.
JP2008082820A Machine Translation (by EPO and Google)—published Apr. 10, 2008; Ricoh KK.
JP2009227909A Machine Translation (EPO, PlatPat and Google) published on Oct. 8, 2009 Fujifilm Corp.
JP2009240925A Machine Translation (by EPO and Google)—published Oct. 22, 2009; Fujifilm Corp.
JP2009271422A Machine Translation (by EPO and Google)—published Nov. 19, 2009; Ricoh KK.
JP2011168024A Machine Translation (EPO, PlatPat and Google) published on Sep. 1, 2011 Ricoh Co Ltd.
JP2013104044A Machine Translation (by EPO and Google)—published May 30, 2013; Three M Innovative Properties.
JP2014008609A Machine Translation (EPO, PlatPat and Google) published on Jan. 20, 2014 Seiko Epson Corp.
JP2014073675A Machine Translation (EPO and Google) published on Apr. 24, 2014 Ricoh Co Ltd.
JP2015202616A Machine Translation (EPO, PlatPat and Google) published on Nov. 16, 2015 Canon KK.
JP2016074206A Machine Translation (EPO and Google) published on May 12, 2016 Xerox Corp.
JP2017093178A Machine Translation (EPO and Google) published on May 25, 2017 Samsung Electronics Co Ltd.
JP48043941 Machine Translation (by EPO and Google)—published Dec. 21, 1973.
JPH10130597A Machine Translation (by EPO and Google)—published May 19, 1998; Sekisui Chemical Co Ltd.
CN101096455A Machine Translation (EPO, PlatPat and Google) published on Jan. 2, 2008 Fujifilm Corp.
CN101248146A Machine Translation (EPO, PlatPat and Google) published on Aug. 20, 2008 Ricoh KK.
CN102341249A Machine Translation (EPO, PlatPat and Google) published on Feb. 1, 2012 Eastman Kodak Co.
CN107879147A Machine Translation (by EPO and Google)—published Apr. 6, 2018; Brother Ind Ltd.
CN1961015A Machine Translation (EPO, PlatPat and Google) published on May 9, 2007 Dainippon Ink Chemicals.
Co-pending U.S. Appl. No. 18/117,423, inventor Helena; Chechik, filed Mar. 4, 2023.
Co-pending U.S. Appl. No. 18/137,127, filed Apr. 20, 2023.
JP2000094660A Machine Translation (by EPO and Google)—published Apr. 4, 2000; Brother Ind Ltd.
JP2000141883A Machine Translation (EPO, PlatPat and Google) published on May 23, 2000 Ricoh KK.
JP2000190468A Machine Translation (EPO, PlatPat and Google) published on Jul. 11, 2000 Brother Ind Ltd.
JP2000337464A Machine Translation (by EPO and Google)—published Dec. 5, 2000; Fuji Xerox Co Ltd.
JP2003227549A Machine Translation (by EPO, PlatPat and Google)—published Aug. 15, 2003; Xerox Corp.
JP2004117118A Machine Translation (by EPO and Google)—published Apr. 15, 2004; Nidec Copal Corp.
JP2005224737A Machine Translation (by EPO and Google)—published Aug. 25, 2005; Mitsubishi Paper Mills Ltd.
JP2006256087 Machine Translation (by EPO and Google)—published Sep. 28, 2006; Ricoh Printing Sys Ltd.
JP2009154377A Machine Translation (by EPO and Google)—published Jul. 16, 2009; Fujifilm Corp.
JP2009279808A Machine Translation (by EPO and Google)—published Dec. 3, 2009; Fuji Xerox Co Ltd.
JP2016179678A Machine Translation (EPO, PlatPat and Google) published on Oct. 13, 2016 Xerox Corp.
JP2018017429A Machine Translation (by EPO and Google)—published Feb. 1, 2018; Rinnai KK.
JP2020014350A Machine Translation (by EPO and Google)—published Jan. 23, 2020; Toshiba Mitsubishi Elec Ind.
JPH05249870A Machine Translation (by EPO, PlatPat and Google)—published Sep. 28, 1993; Matsushita Electric Ind Co Ltd.
JPH09174646A Machine Translation (by EPO and Google)—published Jul. 8, 1997; Kao Corp.
JPS63274572A Machine Translation (by EPO and Google)—published Nov. 11, 1988; Canon KK.
JP2016183049A Machine Translation (by EPO and Google)—published Oct. 20, 2016; Mitsuboshi Belting Ltd.
JPH08245032A Machine Translation (by EPO and Google)—published Sep. 24, 1996; Xerox Corp.

* cited by examiner

ENDLESS FLEXIBLE BELT FOR A PRINTING SYSTEM

CROSS-REFERENCE TO RELATED APPLICATIONS

This application is a continuation of U.S. application Ser. No. 17/014,525 filed on Sep. 8, 2020, which is incorporated herein by reference in its entirety. U.S. application Ser. No. 17/01,452 is a continuation of U.S. application Ser. No. 16/714,756 filed on Dec. 15, 2019 which is incorporated herein by reference in its entirety. U.S. application Ser. No. 16/714,756 is a continuation of U.S. application Ser. No. 16/219,582 filed on Dec. 13, 2018 which is incorporated herein by reference in its entirety. U.S. application Ser. No. 16/219,582 is a continuation of U.S. application Ser. No. 15/790,026 filed on Oct. 22, 2017 which is incorporated herein by reference in its entirety. U.S. application Ser. No. 15/790,026 is a continuation of U.S. application Ser. No. 15/345,238 filed on Nov. 7, 2016 which is incorporated herein by reference in its entirety. U.S. application Ser. No. 15/345,238 is a continuation of U.S. application Ser. No. 14/382,759 filed on Sep. 3, 2014, which is incorporated herein by reference in its entirety. U.S. application Ser. No. 14/382,759 is a 371 national phase entry of PCT/IB13/51719 filed on Mar. 5, 2013, which is incorporated herein by reference in its entirety.

FIELD OF THE INVENTION

The present invention relates to an endless flexible belt for a printing system. The endless belt of the invention finds particular application as an intermediate transfer member in a printing system for an offset printer in which, instead of ink being applied directly onto a substrate, a mirror reflection of the desired image is formed by ink deposition (e.g. ink jetted droplets) on the intermediate transfer member, the latter then serving to transport the image to an impression station at which the image is impressed on a substrate. In its different aspects, the invention is concerned with a flexible belt for use in a printing system, a belt system that comprises such a belt, and an apparatus for installing such a belt in a belt system.

BACKGROUND

Digital printing techniques have been developed that allow a printer to receive instructions directly from a computer without the need to prepare printing plates. Amongst these are color laser printers that use the xerographic process. Color laser printers using dry toners are suitable for certain applications, but they do not produce images of a photographic quality acceptable for publications, such as magazines.

A process that is better suited for short run high quality digital printing is used in the HP-Indigo printer. In this process, an electrostatic image is produced on an electrically charged image bearing cylinder by exposure to laser light. The electrostatic charge attracts oil-based inks to form a color ink image on the image bearing cylinder. The ink image is then transferred by way of a blanket cylinder onto paper or any other printing medium, the substrate.

Inkjet and bubble jet processes are commonly used in home and office printers. In these processes droplets of ink are sprayed onto a final substrate in an image pattern. In general, the resolution of such processes is limited due to wicking by the inks into paper substrates. Fibrous substrates, such as paper, generally require specific coatings engineered to absorb the liquid ink in a controlled fashion or to prevent its penetration below the surface of the substrate. Using specially coated substrates is, however, a costly option that is unsuitable for certain printing applications. Furthermore, the use of coated substrates creates its own problems in that the surface of the substrate remains wet and additional costly and time consuming steps are needed to dry the ink so that it is not later smeared as the substrate is being handled, for example stacked or wound into a roll. Furthermore, excessive wetting of the substrate causes cockling and makes printing on both sides of the substrate (also termed perfecting or duplex printing) difficult, if not impossible. Additionally, direct inkjet printing may result in poor image quality because of variation of the distance between the print head and the surface of the substrate.

Using a printing technique based on an intermediate transfer step overcomes many problems associated with inkjet printing directly onto the substrate. It allows the distance between the surface of the image transfer member and the inkjet print head to be maintained constant, and reduces wetting of the substrate as the ink can be dried on the image transfer surface before being applied to the substrate. Consequently, the final image quality on the substrate is less affected by the physical properties of the substrate.

The use of transfer members which receive ink droplets from an ink or bubble jet apparatus to form an ink image and transfer the image to a final substrate have been reported in the patent literature. Various ones of these systems utilize inks having aqueous carriers, non-aqueous carrier liquids or solid inks that have no carrier liquid at all.

The use of aqueous based inks has a number of distinct advantages. Compared to non-aqueous based liquid inks, the carrier liquid is not toxic and there is no problem in dealing with the liquid that is evaporated as the image dries. As compared with solid inks, the amount of material that remains on the printed image can be controlled, allowing for thinner printed images and more vivid colors.

Generally, a substantial portion or even all the liquid is evaporated from the image on the transfer member before the image is transferred to the final substrate, in order to avoid bleeding of the image into the structure of the final substrate. Various methods are described in the literature for removing the liquid, including heating the image and a combination of coagulation of the image particles on the transfer member, followed by removal of the liquid by heating, air knife or other means.

PCT application No. PCT/IB2013/051716, which entered the US national stage as application Ser. No. 14/382,751 and which claims priority from U.S. Provisional Patent Application No. 61/606,913, (both of which application are herein incorporated by reference in their entirety), teaches a printing process designed to use aqueous inks. The disclosure of the latter application overlaps with disclosure provided herein but it should be made clear that the present invention is not restricted in its application to such a process and may be used in any printing system that uses an intermediate transfer member constructed as a flexible belt regardless of whether or not the ink is water based, hence regardless of the type of release layer suitable to accommodate the ink or printing process being used.

SUMMARY OF THE INVENTION

Embodiments of the present invention relate to the construction and installation of a continuous flexible belt, suitable for use as an intermediate transfer member in a printing system, which belt is guided when in use, for instance over rollers. The flexible belt of the invention may however serve other purposes, for example as a substrate carrier and may also be applicable to a belt mounted over a rotatable rigid drum, also referred to as a drum-mounted blanket. The invention seeks in particular to provide a flexible belt that remains in a well defined plane as it travels around an endless path and that is constrained laterally to prevent it from meandering.

In accordance with some embodiments, there is provided a flexible belt for use in a printing system, comprising an endless strip which, in use, travels along a continuous path, wherein formations are provided along the sides of the strip which are capable of engaging with lateral tracks to place the belt under lateral tension, the lateral tracks further serving to constrain the belt to follow the continuous path.

In an embodiment of the invention intended for use as an intermediate transfer member in a printing system, the strip is an initially elongate strip having parallel straight sides of which the ends are releasably or permanently securable to one another to form an endless loop, and, when in use, the belt serves to transport ink images from an image forming station to an impression station of the printing system.

The ends of the elongate strip may be secured to one another in a releasable manner (e.g. zip fastener, hooks or magnets) or permanently by soldering, gluing, or taping (e.g. using Kapton® tape, RTV liquid adhesives or PTFE thermoplastic adhesives with a connective strip overlapping both ends of the strip), or by any other method commonly known. Any previously mentioned method of joining the ends of the belt may cause a discontinuity, referred to herein as a seam, and it is desirable to avoid an increase in the thickness or discontinuity of chemical and/or mechanical properties of the belt at the seam.

In an alternative embodiment, the belt is devoid of a scam and is formed as a continuous belt.

The strip from which the belt is made generally comprises at least a reinforcement layer and a release layer. In some embodiments, the belt additionally includes a compressible layer so that the belt may itself serve in a manner analogous to the blanket of an offset litho press. In other embodiments, a blanket cylinder carrying a compressible blanket, also termed a pressure cylinder, may be provided at the impression station, and the belt, which may then be optionally devoid of a compressible layer, may pass between a pressure cylinder and an impression cylinder in order for the ink image that it carries to be impressed on the substrate.

In some embodiments of the invention, each side of the strip from which the belt is made is provided with spaced formations. Such spaced formations may conveniently be the teeth of one half of a zip fastener that is secured to the belt along the respective side of the strip. The laterally projecting formations need not be evenly spaced and in an embodiment of the invention a predetermined irregular spacing may serve to control parameters associated with the use of the belt in a printing system.

In an alternative embodiment, the formations may comprise two flexible beads, arranged one on each side of the strip, the beads having a diameter larger than the thickness of the belt. In this arrangement, the bead is considered to provide a continuous formation on each side of the strip.

In an alternative embodiment, the formations may be a combination of beads and lateral spaced projections. The combination advantageously permits identification of belt sections corresponding to the lateral projection adjacent to that section, each section having unique projection characteristics (e.g. color, shape, etc.). Additionally or alternatively, each side of the strip may have different formations.

The formations, irrespective of shape, spacing along the edges or lack thereof, can be made of any material having heat resistivity compatible with the operating temperature at which the belt is used. Preferably, the formations may be made of a material having a low friction coefficient to ensure their smooth running within the lateral tracks. Using materials having satisfactory abrasion resistance can advantageously reduce or prevent the formation of debris that may result from the rapid displacement of a belt during the printing process. In one embodiment, the formations are made of a material having or comprising an agent having lubricating properties. Lamellar materials may serve as lubricating agents in the formations positioned at the side of the belt. In one embodiment, the formations used for the lateral guidance of the belt are made of a nylon or polyamide polymer supplemented with molybdenum disulfide or from polyacetal filled with PFTE. Alternatively, or in addition, the formations may have an anti-friction coating, such as PTFE.

As an alternative, or in addition, the track with which the formations engage may be lubricated or anti-friction coated or impregnated with an agent able to reduce friction. In one embodiment, the lateral tracks are made of anodized aluminum or of stainless steel. The porosity of the material may advantageously be used to impregnate the lateral tracks with an anti-friction agent, such as PTFE.

As an alternative or in addition, the track and formations may have opposing magnetic properties thereby creating repulsive forces between each other, thus lessening frictional forces.

In some embodiments, the spaced formations or the flexible beads may be retained in the tracks by rollers that rotate as the belt moves along the track.

In some embodiments, the ends of the strip may be secured to one another to form a continuous loop using end formations similar to the formations projecting laterally from the strip to enable belt tensioning and/or guiding along the tracks. For example, the ends of the strip may each be secured to one half of a zipper.

In a second aspect of the invention, a belt as set out above forms part of a belt system having a support frame having supporting surfaces for guiding and driving the belt, wherein the support frame further includes two lateral tracks, extending one on each side of the belt, each track being of suitable cross-section to slidably retain the formations on the sides of the belt. For example, lateral formations having an approximate circular cross-section may be retained by tracks having a C-shaped cross-section. In some embodiments, the surfaces for guiding and driving the belt comprise rotating rollers but other means of supporting the belt, such as a pneumatic table or linear drive, may alternatively be used. Such support may be provided by indirect or intermittent contact. In one embodiment, a single roller may suffice, a situation corresponding to the belt being mounted on a drum.

In some embodiments, lateral guiding tracks are provided to guide and tension the belt only in the region of the image forming station. In some embodiments, lateral guiding tracks are additionally provided at the impression station at which the image is impressed on the substrate. In some embodiments, lateral guiding tracks are additionally provided at strategic positions such as drying station(s), cooling station(s), conditioning station, etc. In still further embodiments, continuous guide tracks are provided around the full circumference of the support frame of the belt system along the path to be followed by the belt.

In an embodiment, plates are mounted on the support frame having support surfaces contacting the inner side of the belt, the support surfaces lying in a plane offset from a flat plane passing through the two tracks such that lateral tension in the belt, resulting from engagement of the formations in the tracks, serves to flatten the belt against the support surfaces.

In accordance with a further aspect, the invention provides an apparatus for assembling a belt system comprising a) an elongate strip having parallel straight sides, formations along the length of the sides of the strip, and two ends securable to one another to form an endless loop flexible belt; and b) a support frame having surfaces for supporting the belt and including two tracks, extending one on each side of the belt, each track having a cross section suitable to retain slidably the formations on the sides of the belt;

said assembling apparatus comprising i) a rigid body defining two open-ended tracks, arranged one on each side of the body, for receiving the formations on the sides of the strip; a first end permitting introduction into the tracks of formations on the sides of a strip that is to be looped to form a belt, and the second end of each track being engageable with branch entry points provided in a respective one of the endless tracks of the support frame; and ii) at least one sprocket rotatably mounted on the body to engage with the formations located within one of the open-ended tracks to feed the elongate strip into the endless tracks.

Two sprockets may be mounted on a common shaft to engage with the formations lying within both open-ended tracks and the sprockets may be mounted on a common shaft, driven manually or by an electric motor.

To assist in applying a lateral stress to the belt during its mounting on the support frame, the open-ended tracks may be divergent, being more closely spaced apart from each other at the first one end than at the second end.

An anchoring may furthermore be provided to permit the body of the apparatus to be secured to the support frame of the belt to ensure accurate guidance of the belt as it is fed onto the support frame.

In an alternative embodiment, the belt may be installed by securing the leading edge of the belt strip introduced first in between the lateral tracks to a cable which can be manually or automatically moved to install the belt. For example, one or both lateral ends of the belt leading edge can be reversibly attached to a cable residing within each track. Advancing the cable(s) in turn advances the belt along the tracks. Alternatively or additionally, the edge of the belt in the area ultimately forming the seam when both edges are secured one to the other can have lower flexibility than in the areas other than the seam. This local “rigidity” may ease the insertion of the lateral formations of the belt strip into their respective tracks.

BRIEF DESCRIPTION OF THE DRAWINGS

The invention will now be described further, by way of example, with reference to the accompanying drawings, in which the dimensions of components and features shown in the figures are chosen for convenience and clarity of presentation and not necessarily to scale. In the drawings.

DETAILED DESCRIPTION OF THE ILLUSTRATED EMBODIMENTS

General Overview

Figure 1:
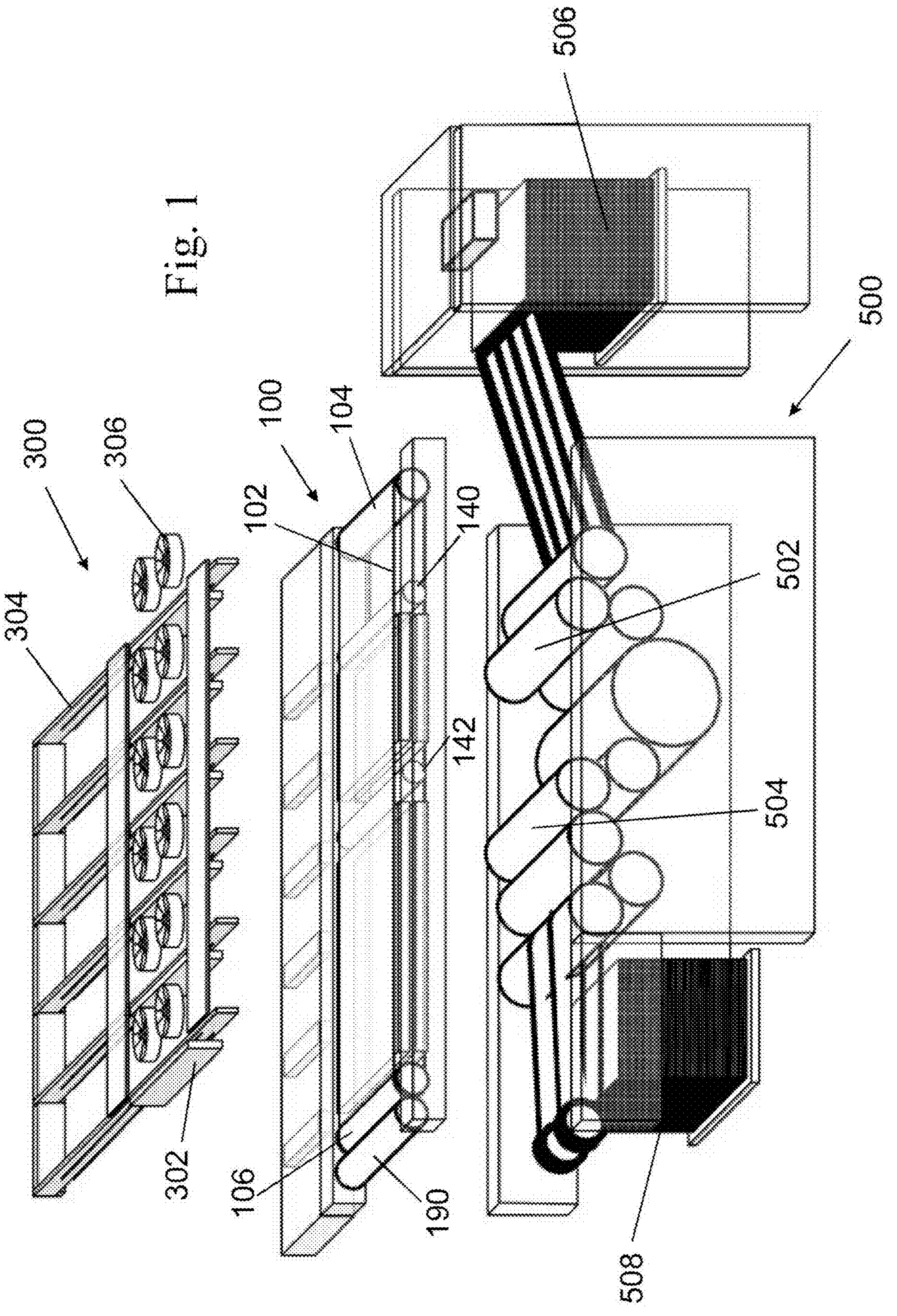
FIG. 1 is a schematic perspective view of a sheet-fed printing system.

The printing system shown in FIGS. 1 and 2, which operates in accordance with the principles taught in U.S. Provisional Patent Application No. 61/606,913, essentially comprises three separate but mutually interacting systems, namely a belt system 100, an image forming system 300 above the belt system 100 and a substrate transport system 500 below the belt system 100.

The belt system 100, with which the present invention is primarily concerned, comprises an endless belt or blanket 102, that acts as an intermediate transfer member and is guided over two rollers 104, 106. An image made up of dots of an ink is applied by the image forming system 300 to the upper run of the belt 102 at an image forming station and the lower run selectively interacts at two impression stations with two impression cylinders 502 and 504 of the substrate transport system 500 to impress an image onto a substrate compressed between the belt 102 and the respective impression cylinder 502, 504. As will be explained below, the purpose of there being two impression stations is to permit duplex printing. In the case of a simplex printing system, only one impression cylinder would be needed.

Figure 5:
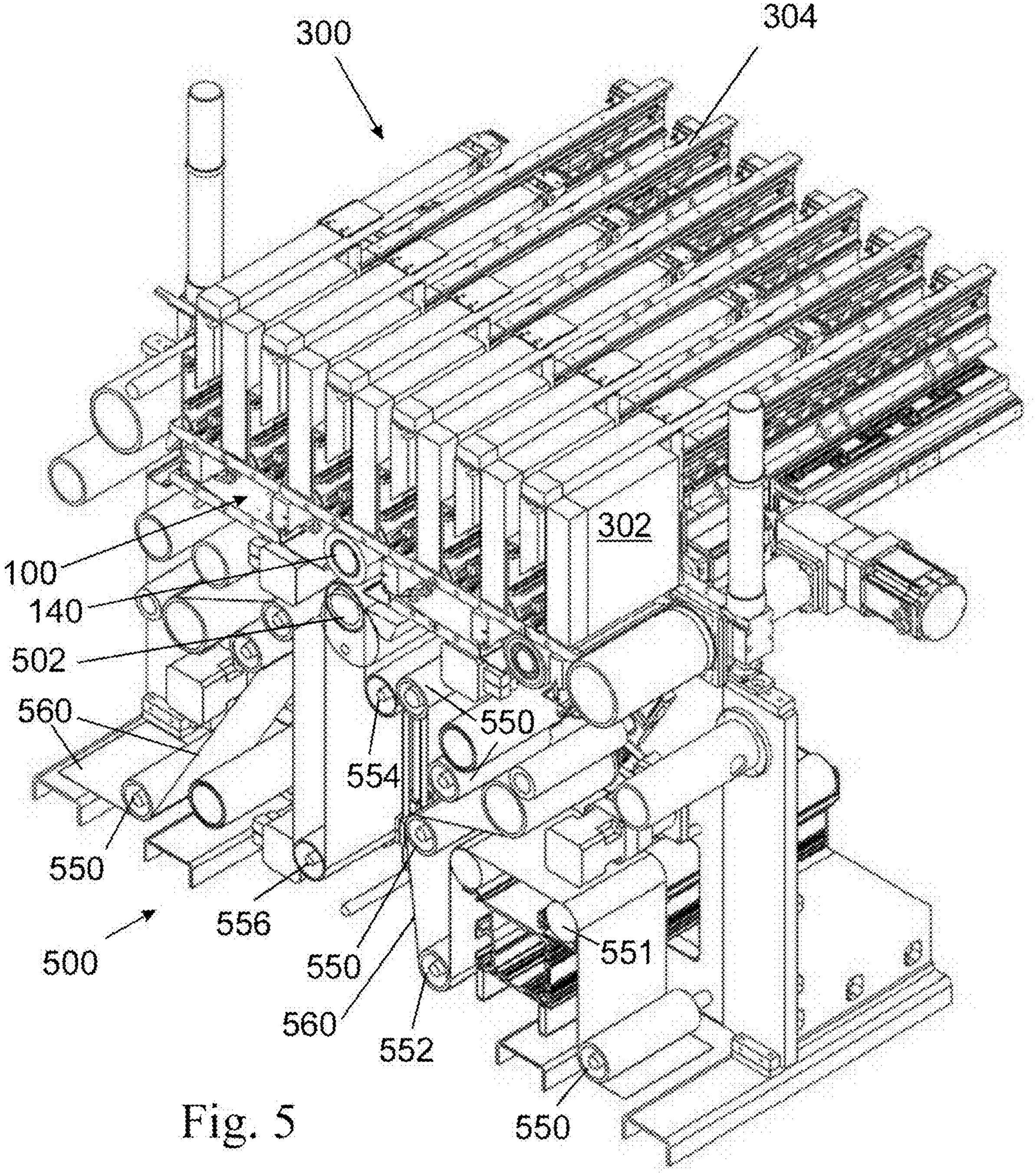
FIG. 5 is a perspective cross-sectional view of a printing system intended for printing on a continuous web of the substrate.

In operation, ink images, each of which is a mirror image of an image to be impressed on the substrate, are printed by the image forming system 300 onto the upper run of the belt 102. In this context, the term “run” is used to mean a length or segment of the belt between any two given rollers over which the belt is guided. While being transported by the belt 102, the ink is dried by irradiation and/or the application of heat and/or a gas stream, to render tacky the ink residue remaining after evaporation of most, if not all, of the liquid carrier. At the impression stations, the image is impressed onto individual sheets of a substrate which are conveyed by the substrate transport system 500 from an input stack 506 to an output stack 508 via the impression stations. As an alternative, as shown in FIG. 5, the substrate may be a continuous web extending between an input supply roll and an output take-up roll.

Image Forming System

The image forming system 300 comprises inkjet print bars 302 each slidably mounted on a frame 304 positioned at a fixed or adjustable height above the surface of the belt 102. Each print bar 302 may include a plurality of print heads with individually controllable print nozzles. The print heads are together as wide as the printing area on the belt 102 though the print bars 302 may be wider than the belt. The printing system can have any number of bars 302, each of which may contain an ink of a different color.

As some print bars may not be required during a particular printing job, the bars can be moved between an operative position, in which they overlie the belt 102 and an inoperative position. One such mechanism for moving the bars 302 between their operative and inoperative positions is schematically shown in FIG. 5, but need not be described herein. It should be noted that the print bars remain stationary during printing.

When moved to their inoperative position, the bars are covered for protection and to prevent the nozzles of the print bar from drying or clogging. In an embodiment of the invention, the print bars are parked above a liquid bath that assists in this task. Print bars that are in the inoperative position can be changed and accessed readily for maintenance, even while a printing job is in progress using other print bars.

Within each print bar, the ink may be constantly recirculated, filtered, degassed and maintained at a desired temperature and pressure. As the design of the print bars may be conventional, or at least similar to print bars used in other inkjet printing applications, their construction and operation will be clear to the person skilled in the art without the need for more detailed description.

As the different print bars 302 are staggered from one another along the length of the belt, it is of course essential for their operation to be correctly synchronized with the movement of the belt 102.

Belt and Belt Support System

Figure 6:
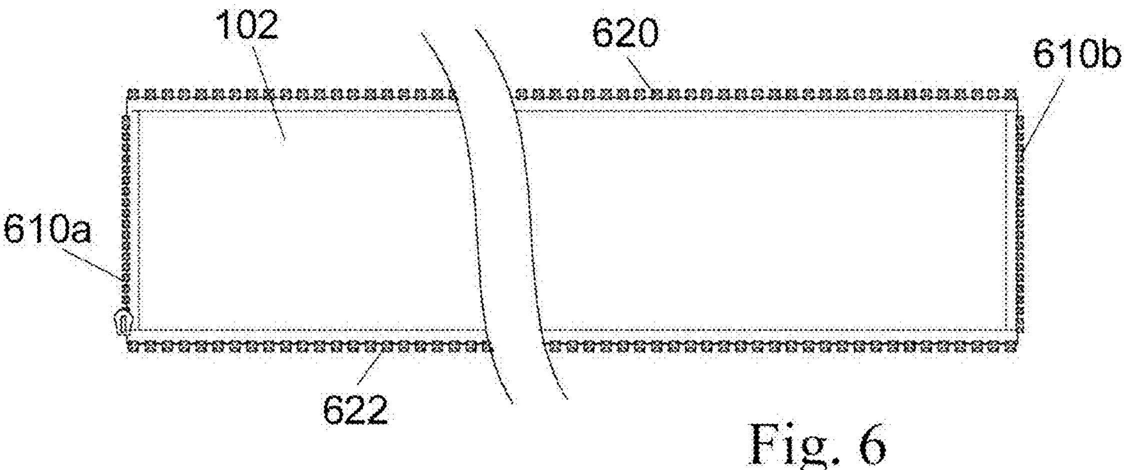
FIG. 6 is a schematic plan view of a first embodiment of a belt in accordance with the invention.
Figure 7:
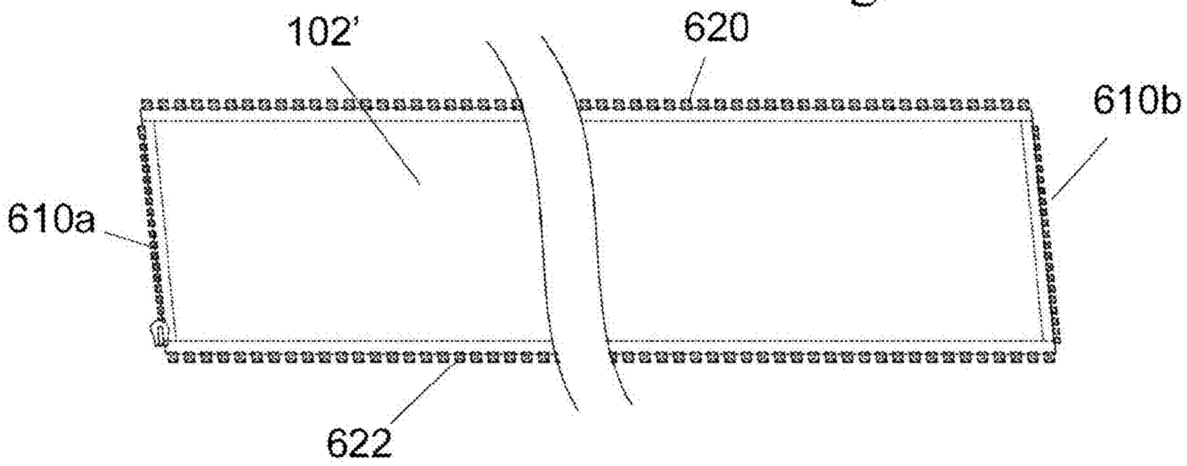
FIG. 7 is a schematic plan view similar to that of FIG. 6 showing an alternative embodiment of the invention.

The belt 102 in the present invention is releasably or permanently seamed. In particular, as shown in FIG. 6, the belt 102 is formed of an initially flat strip of which the ends are fastened to one another to form a continuous loop. A releasable fastening is illustrated in FIG. 6 which is formed of zip fastener of which the two halves 610*a* and 610*b* are secured to the opposite ends of the belt 102. As an alternative, a releasable fastener may be a hook and loop fastener. In the embodiment illustrated in FIG. 6, the fastener 610*a*, 610*b* lies substantially parallel to the axes of the rollers 104 and 106 over which the belt is guided. In order to avoid a sudden change in the tension of the belt as the scam passes over these rollers, the belt 102' in an embodiment of the invention illustrated in FIG. 7 has ends that are slightly inclined relative to the axis of the rollers. As this has the effect of enlarging the non-printable image area, the angle of inclination is desirably kept small, being preferably less than 10° or more preferably in the range of 2° to 8°.

Alternatively, the belt can be seamless, hence relaxing certain constraints from the printing system (e.g. synchronization of scam's position) while requiring alternative mounting methods. Whether seamless or not, the primary purpose of the belt in one embodiment of the invention is to receive an ink image from the image forming system and to transfer that image dried but undisturbed to the impression stations formed by the engagement of the belt in-between an impression cylinder and a corresponding pressure or nip roller. To allow easy transfer of the ink image at each impression station, the belt has a thin upper release layer that may be hydrophobic, being formed, for example, of a silicone containing composition.

The strength of the belt is derived from a reinforcement layer. In one embodiment, the reinforcement layer is formed of a fabric. If the fabric is woven, the warp and weft threads of the fabric may have a different composition or physical structure so that the belt should have, for reasons to be discussed below, greater elasticity in its width ways direction (parallel to the axes of the rollers 104 and 106) than in its lengthways direction. The fabric can be fiber-reinforced so as to be substantially inextensible lengthwise. By “substantially inextensible”, it is meant that during any cycle of the belt, the distance between any two fixed points on the belt will not vary to an extent that will affect the image quality. The length of the belt may however vary with temperature or, over longer periods of time, with ageing or fatigue. In its width ways direction, the belt may have a small degree of elasticity to assist it in remaining taut and flat as it is pulled through the image forming station. A suitable fabric may, for example, have high performance fibers, such as glass, carbon, ceramic or aramid fibers, in its longitudinal direction woven, stitched or otherwise held with cotton fibers in the perpendicular direction.

The belt may comprise additional layers between the reinforcement layer and the release layer, for example to provide conformability of the release layer to the surface of the substrate, e.g. a compressible layer and a conformational layer, to act as a thermal reservoir or a thermal insulator, to allow an electrostatic charge to be applied to the surface of the release layer, to improve the adhesion or compatibility between any layers forming the belt, and/or to prevent migration of molecules therebetween. An inner layer may further be provided to control the magnitude of frictional forces on the belt as it is moved over its support structure.

Figure 3:
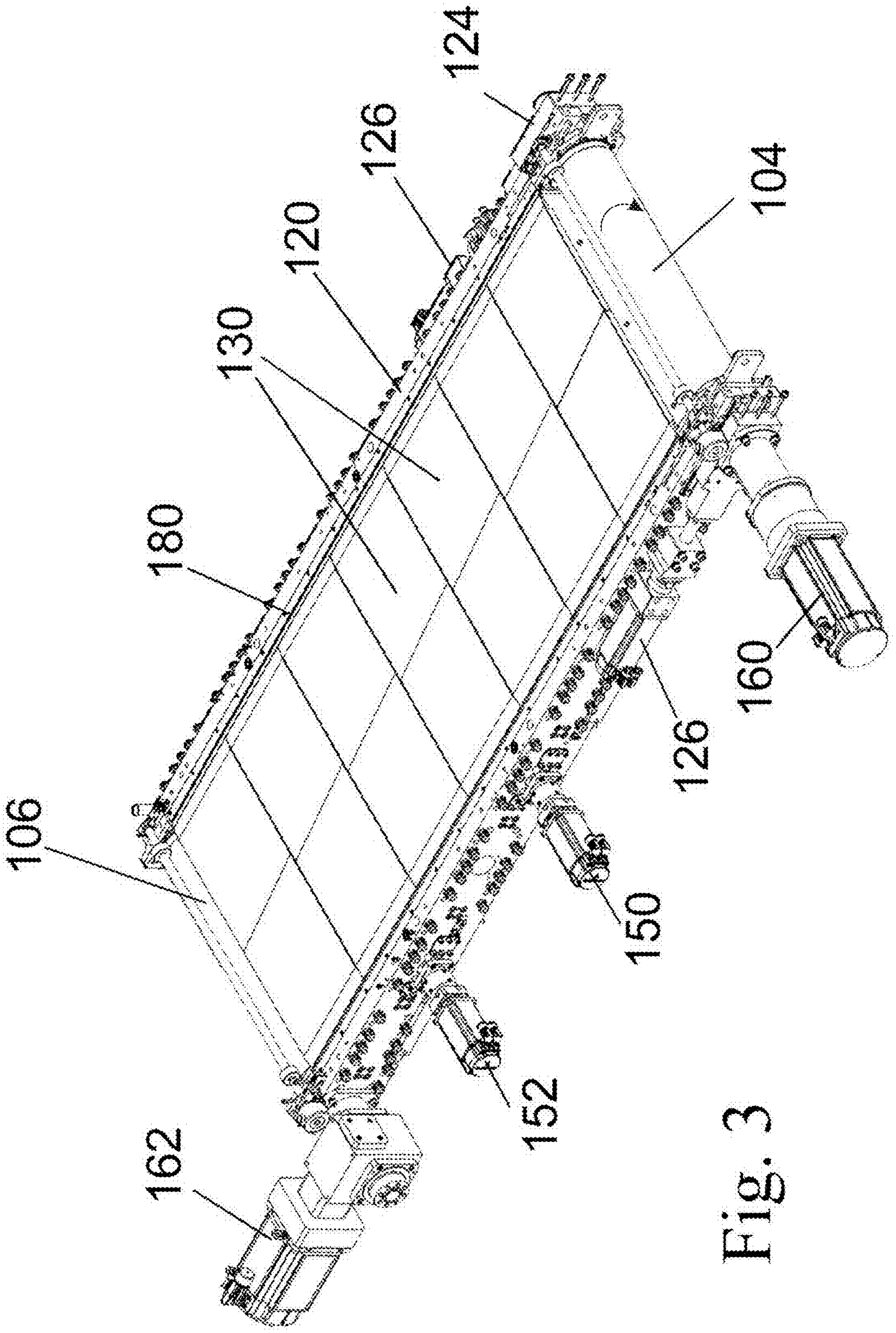
FIG. 3 is a perspective view of a belt support system with the belt removed.
Figure 4:
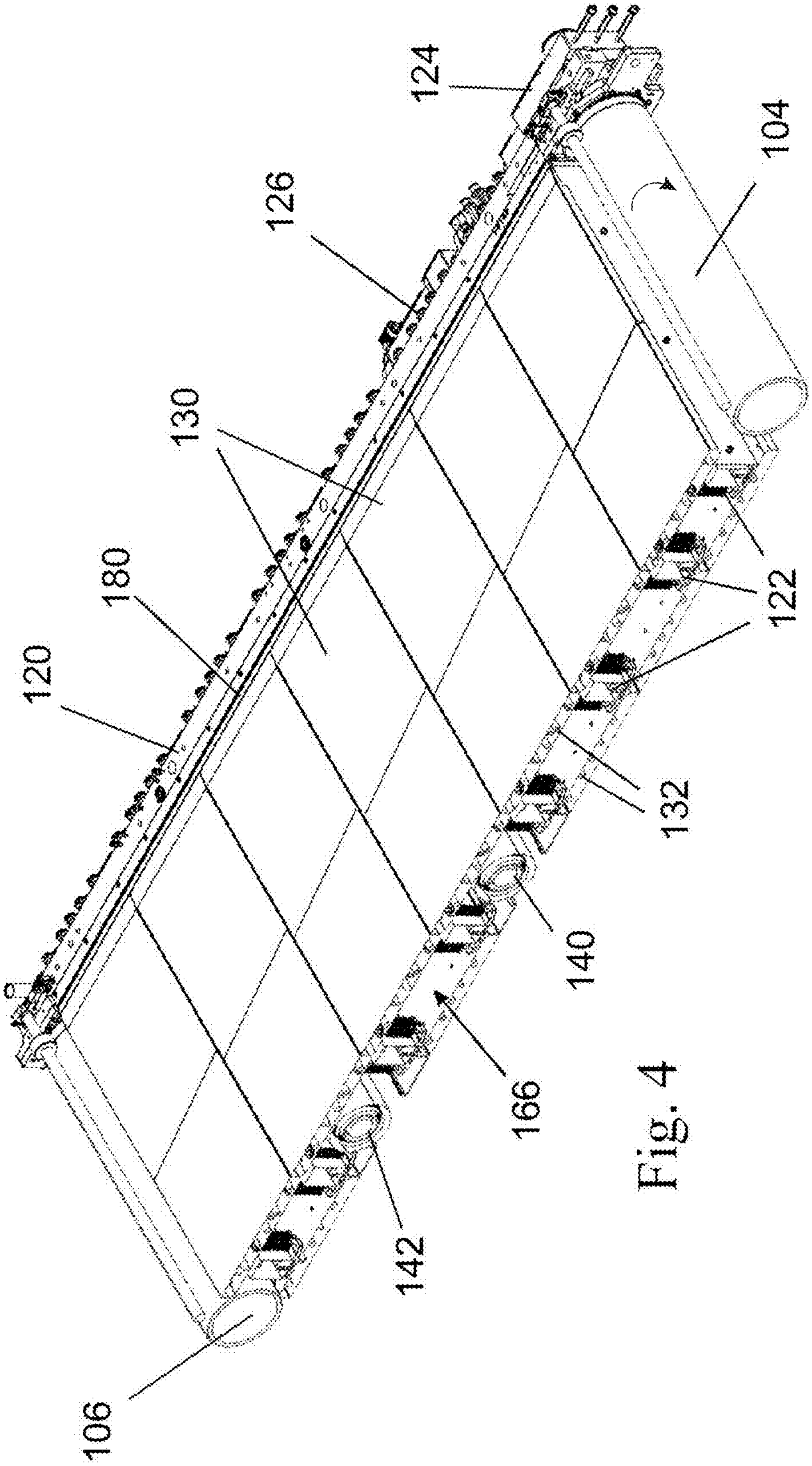
FIG. 4 shows a section through the belt support system of FIG. 3 showing its internal construction.

A structure capable of supporting a belt according to the invention is shown in FIGS. 3 and 4. Two elongate outriggers 120 are interconnected by a plurality of cross beams 122 to form a horizontal ladder-like frame on which the remaining components are mounted.

The roller 106 is journalled in bearings that are directly mounted on the outriggers 120. At the opposite end, however, the roller 104 is journalled in pillow blocks 124 that are guided for sliding movement relative to the outriggers 120. Electric motors 126, which may be stepper motors, act through suitable gearboxes to move the pillow blocks 124, so as to alter the distance between the axes of the rollers 104 and 106, while maintaining them parallel to one another.

Thermally conductive support plates 130 are mounted on the cross beams 122 to form a continuous flat support surface both on the top side and the bottom side of the support frame. The junctions between the individual support plates 130 can be intentionally zigzagged in order not to create a line running parallel to the length of the belt 102. Electrical heating elements 132 can be inserted into transverse holes in the plates 130 to apply heat to the plates 130 and through the plates 130 to the overlying belt 102.

Also mounted on the belt support frame are two pressure or nip rollers 140, 142. The pressure rollers are located on the underside of the support frame in gaps between the support plates 130 covering the underside of the frame. The pressure rollers 140, 142 are aligned respectively with the impression cylinders 502, 504 of the substrate transport system.

Each of the pressure rollers 140, 142 is mounted on an eccentric that is rotatable by a respective actuator 150, 152. When it is raised by its actuator to an upper position within the support frame, each pressure roller is spaced from the opposing impression cylinder, allowing the belt to pass by the impression station without making contact with the impression cylinder itself nor with a substrate carried by the impression cylinder. On the other hand, when moved downwards by its actuator, each pressure roller 140, 142 projects downwards beyond the plane of the adjacent support plates 130 and deflects the belt 102, urging it against the opposing impression cylinder 502, 504.

The rollers 104 and 106 are connected to respective electric motors 160, 162. The motor 160 serves to drive the belt clockwise as viewed in FIGS. 3 and 4. The motor 162 is used to provide a torque reaction and can serve regulate the tension in the upper run of the belt.

In one embodiment of the invention, the motors operate at the same speed, to maintain the same tension in the upper and lower runs of the belt.

In an alternative embodiment of the invention, the motors 160 and 162 are operated in such a manner as to maintain a higher tension in the upper run of the belt where the ink image is formed and a lower tension in the lower run of the belt. The lower tension in the lower run may assist in absorbing sudden perturbations caused by the abrupt engagement and disengagement of the belt 102 with the impression cylinders 502 and 504.

In an embodiment of the invention, a fan or air blower (not shown) is mounted on the frame to maintain a sub-atmospheric pressure in the volume 166 bounded by the belt and its support frame. The negative pressure serves to maintain the belt flat against the support plates 130 on both the upper and the lower side of the frame, in order to achieve good thermal contact. If the lower run of the belt is set to be relatively slack, the negative pressure would also assist in and maintaining the belt out of contact with the impression cylinders when the pressure rollers 140, 142 are not actuated at the impression stations.

Figure 8:
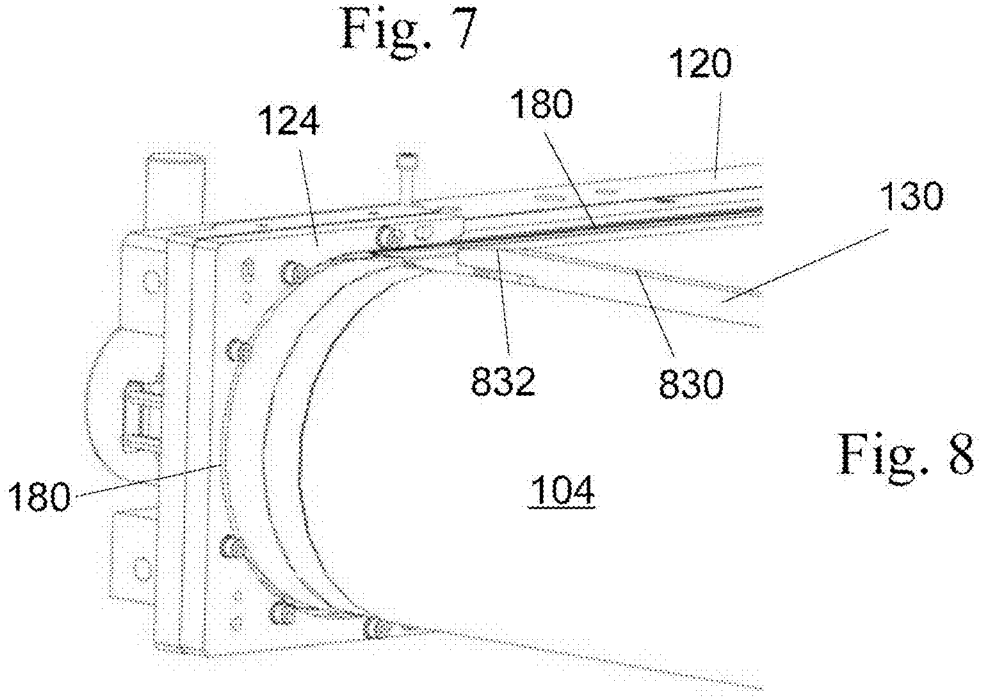
FIG. 8 is a detail of the belt support frame showing a track for retaining the formations on the sides of the strip in FIG. 4.

Each of the outriggers 120 also supports a continuous track 180, shown in more detail in FIG. 8, which engages formations on the side edges of the belt 102 to maintain the belt taut in its width ways direction. The formations may be flexible continuous beads or the teeth of two halves of a zip fastener (designated 620 and 622 in FIGS. 6 and 7) attached to the side edge of the belt 102 and the track 180 may be a channel of a suitable cross-section, for example C-shape, to receive the teeth. As can be seen in FIG. 8, the upper surface 830 of the support plates 130 is offset from the plane of the tracks 180 and the sides of the plates 130 have ramped surfaces 832 to avoid the belt being stretched over any sharp edges. The effect of this shaping of the plates 130 is that the lateral tension in the belt 102 tends to flatten its central region against the support plates 130. To reduce drag, in an embodiment of the invention, the lateral projecting formations are coated with an anti-friction coating though it is alternatively possible to lubricate the track 180 or coat it with 13 an anti-friction layer. The formations are preferably made of a material having low friction, high abrasion resistance and "self lubricating" properties. When used in printing systems requiring elevated temperatures, the material is suitably temperature resistant. Likewise, the tracks can be made of a suitable material impregnated with an anti-friction agent.

Though the lateral tracks may be made of an anodized aluminum or stainless steel, it has been found that lateral tracks having higher hardness and/or lesser asperities (e.g. having a more polished surface interface with the lateral formations of the belt) are less prone to debris formation.

As a further alternative, the tracks may, as will be described below by reference to FIG. 13, have rollers that serve to retain the spaced formations within the tracks.

Figure 9:
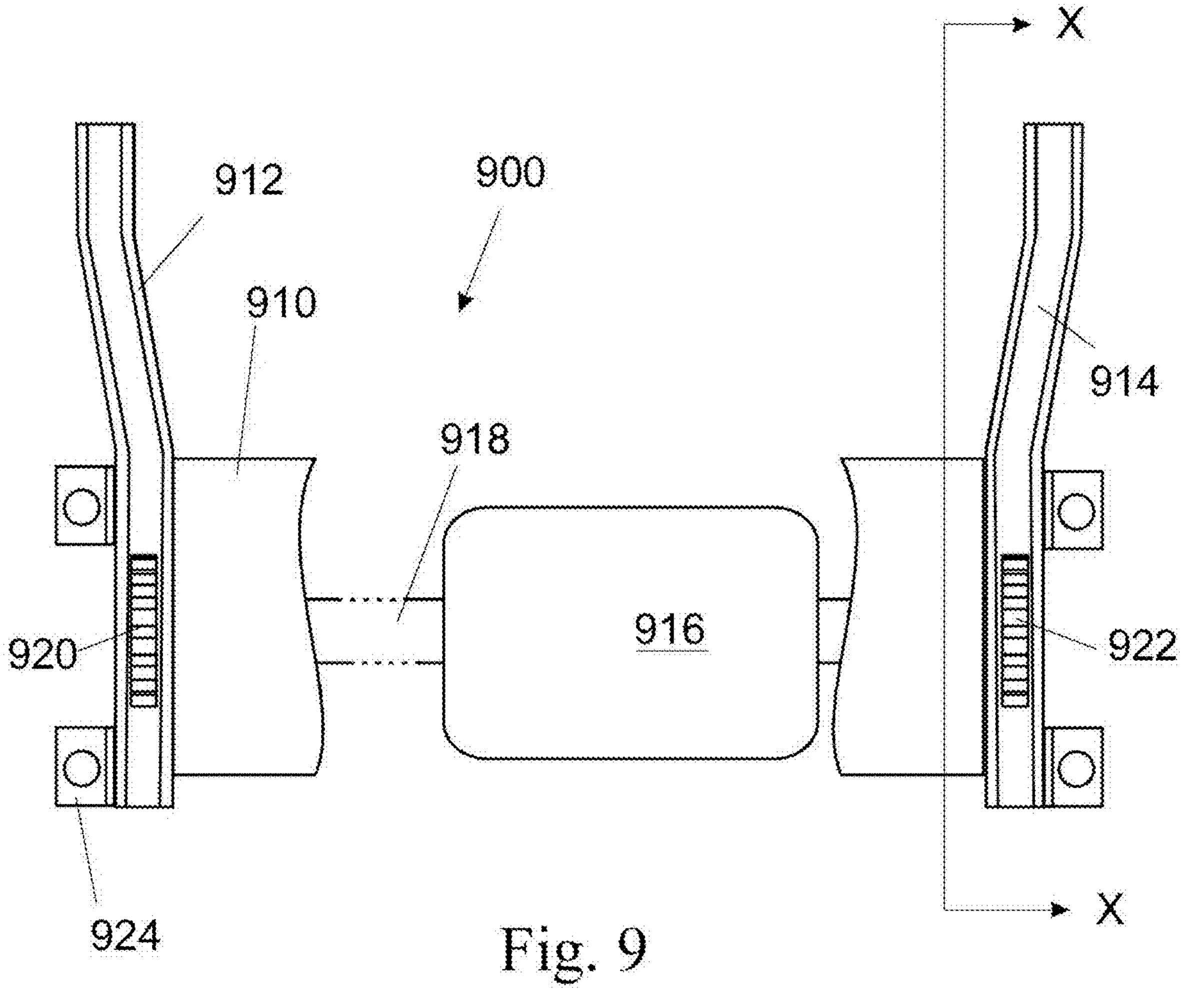
FIG. 9 is a schematic representation of an apparatus for installing a belt in the support system of FIG. 3 or FIG. 11.
Figure 10:
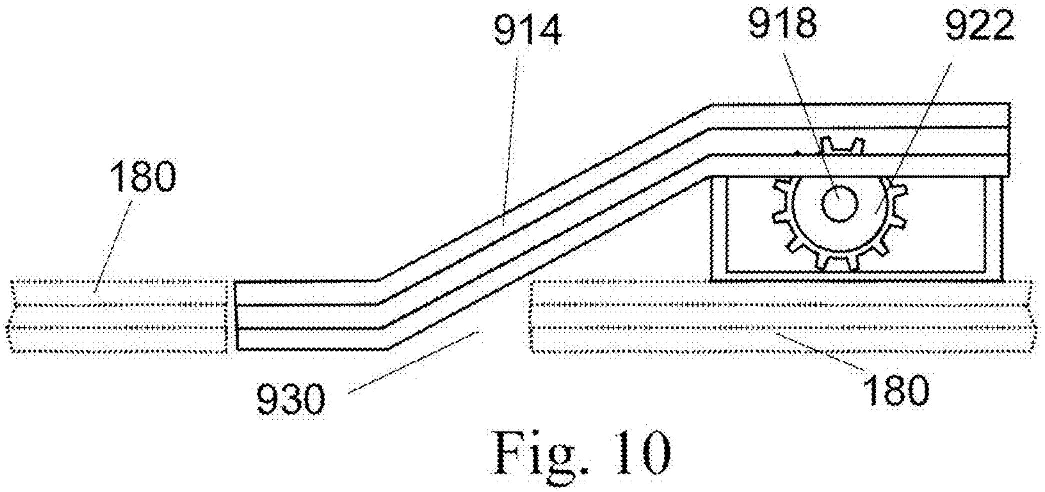
FIG. 10 is a section along the line X-X in FIG. 9.

To mount a seamed belt on its support frame, an apparatus as shown in FIGS. 9 and 10 may be used. The apparatus 900 comprises a body 910 carrying at its opposite ends a pair of open-ended tracks 912, 914, similar in their cross-section to the tracks 180. The body 910 houses an electric motor 916 having an output shaft 918 that extends the full width of the body 910. At its opposite ends, the shaft is keyed into two drive sprockets 920, 922 that extend into the tracks 912 and 914, respectively. Anchoring points 924 are also provided on the body 910 to allow the apparatus to be secured relative to the frame of the belt system.

The open ended tracks 912, 914 are bent in two planes. First, when viewed from above, as in FIG. 9, the tracks are more widely spaced apart from each other at a strip exit end than at the entry end. Furthermore, when viewed from the side, as shown in FIG. 10, the entry end of each track 912, 914 which engages with one of the sprockets 920, 922, is higher than the exit end which, in use, is positioned in alignment with a section of the endless track 180.

To mount on the support frame a belt that is to be seamed, the apparatus of FIG. 9 is first secured to the support frame using the anchoring points 924 so that the second ends of the open-ended tracks 912, 924 sit within entry points 930 in the endless tracks 180. The side edges on the opposite sides of the belt strip 102 are next inserted into the entry ends of the open-ended tracks 912, 914 and advanced manually until the formations engage the sprockets 920, 922. When the motor 916 is engaged to drive the sprockets 920, 922, it will advance the belt strip towards the exit ends and then into the endless tracks 180, at the same time placing the strip under lateral tension. The belt strip 102 is then fed into the 13 endless tracks 180 and advanced until it has been wrapped around the entire support frame, whereupon its ends may be zipped or otherwise attached together to form a continuous loop. Next, the rollers 104 and 106 may be moved apart to extend the belt to its desired length.

Sections of the tracks 180 are telescopically collapsible to provide suitable entry points for inserting and withdrawing a belt strip and to permit the length of the endless tracks 180 to vary as the distance between the roller % 104 and 106 is varied. Additionally or alternatively, there may be a gap in the track to allow for insertion of the belt.

It should be mentioned that it is not essential to use a separate apparatus for the purpose of installing a belt as it would alternatively be possible to integrate the assembling apparatus into the tracks 180. Furthermore, for belt replacement, it is possible to secure the end of the old belt to the end of a new one and to use the old belt and one of the drive rollers 104, 106 to advance the new belt into position.

Because the belt may contain an unusable area resulting from the seam, it is important to ensure that this area should always remain in the same position relative to the printed images in consecutive cycles of the belt. Also, during simplex printing, when one of the pressure rollers may be permanently engaged with its impression cylinder at an impression station, it is important to ensure that whenever the seam passes the impression cylinder, it always coincides with a time when an interruption in the surface of the impression cylinder that accommodates the substrate grippers. For such timing to be possible, it is important to set the length of the belt to be a whole number multiple of the circumference of the impression cylinders 502, 504. This relationship can be achieved by moving the rollers 104, 106 apart using the motors 126. The length of the belt can be determined from a shaft encoder measuring the rotation of one of rollers 104, 106 during one sensed complete revolution of the belt and a closed loop control system may be used to maintain the length of the belt at its desired value.

If the seam position is noted to be moving towards an image area of the belt, an alternative method by which it can be adjusted is to vary the speed of the belt 102 at times when it is not engaged with the impression cylinders 502, 504 at the impression stations.

The position of the belt can be monitored by means of one or more markings on the surface or edges of the belt that can be detected by one or more sensors mounted at different positions along the length of the belt. The output signals of these sensors are used to indicate the position of the intermediate transfer member to the printing bars of the image forming system 300. For example, such system of belt markings and corresponding detectors may be used to monitor the position of the seam with respect to the cylinders of the impression stations. Analysis of the output signals of the sensors is also used to control the speed of the motors 160 and 162 to match that of the impression cylinders 502, 504. The marker(s) may for example be located on the surface of the belt and can be sensed magnetically or optically by a suitable detector, or it may be an irregularity in the lateral formations that are used to maintain the belt under tension, for example a missing tooth or a formation of different geometry, hence forming a mechanical type of signal.

It is further possible to incorporate into the belt an electronic circuit, for example a microchip similar to those to be found in "chip and pin" credit cards, in which data may be stored. The microchip may comprise only read only memory, in which case it may be used by the manufacturer to record such data as where and when the belt was manufactured and details of the physical or chemical properties of the belt. The data may relate to a catalog number, a batch number, and any other identifier allowing providing information of relevance to the use of the belt and/or to its user. This data may be read by the controller of the printing system during installation or during operation and used, for example, to determine calibration parameters. Alternatively, or additionally, the chip may include random access memory to enable data to be recorded by the controller of the printing system on the microchip. In this case, the data may include information such as the number of pages or length of web that have been printed or transported using the belt, or previously measured belt parameters such as belt length, to assist in recalibrating the printing system when commencing a new print run. Reading and writing on the microchip may be achieved by making direct electrical contact with terminals of the microchip, in which case contact conductors may be provided on the surface of the belt. Alternatively, data may be read from the microchip using radio signals, in which case the microchip may be powered by an inductive loop printed on the surface of the belt.

As its length is important, the belt is required to resist irreversible stretching and creep. In the transverse direction, on the other hand, it is only required to maintain the belt flat taut without creating excessive drag due to friction with the support plates 130. It is for this reason that, in an embodiment of the invention, the elasticity of the belt is intentionally made anisotropic.

The lateral tracks may be positioned at a distance greater than the overall width of the belt. In a further embodiment, the lateral stress applied to the belt can be adjusted or maintained by modifying the distance between the lateral tracks.

Belt Pre-Treatment

FIG. 1 shows schematically a roller 190 positioned immediately before the roller 106, according to an embodiment of the invention. The function of this roller is, if required, to apply a thin film of pre-treatment or conditioning solution containing a chemical agent, for example a dilute solution of a charged polymer, to the surface of the belt. The film is preferably totally dried by the time it reaches the print bars of the image forming system 300, to leave behind a very thin layer on the surface of the belt that assists the ink droplets to retain their film-like shape after they have impacted the surface of the belt.

While a roller can be used to apply an even film, in an alternative embodiment the optional pre-treatment solution can be sprayed onto the surface of the belt and spread more evenly, for example by the application of a jet from an air knife, a drizzle from sprinkles or undulations from a fountain. The pre-treatment solution may be removed from the transfer member shortly following its exposure therewith (e.g. using air flow). Release layers of belts amenable to such treatment may comprise a silanol-, sylyl- or silane-modified or terminated polydialkylsiloxane silicone.

As an alternative embodiment, the release layer may be made of a silicone composition having suitable built-in charges or internal charging properties (e.g. an amino silicone), so that the above-described ink droplet substantial "freezing" upon impact on the intermediate transfer member is achieved without the application of an external chemical agent.

While not wishing to be bound by theory, it is believed that the fixing of aqueous ink droplets on the hydrophobic surface of a belt according to one embodiment of the invention is the result of a Brønsted-Lowry interaction between organic polymeric resin(s) in the ink and the chemical agent applied to the belt or a component of the release layer of the belt. In this particular embodiment, there is no chemical reaction that affects the composition of the ink or the surface of the belt but an electrostatic attraction between polar molecules in the ink and those on or in the release layer, that prevents the ink droplets from contracting or from moving around on the hydrophobic release surface of the belt, at least during the time period required to evaporate the ink carrier from the ink image.

Ink Image Heating

The heaters 132 inserted into the support plates 130 are used to heat the belt to a temperature that is appropriate for the rapid evaporation of the ink carrier and compatible with the composition of the belt. For belts comprising for instance silanol-terminated polydialkylsiloxane silicones in the release layer, heating is typically of the order of 150° C., though this temperature may vary within a range from 120° C. to 180° C., depending on various factors such as the composition of the inks and/or of the pre-treatment solutions if needed. Belts comprising amino silicones may generally be heated to temperatures between 70° C. and 130° C. When, as illustrated, the transfer member is heated from beneath, it is desirable for the belt to have relatively high thermal capacity and low thermal conductivity, so that the temperature of the body of the belt 102 will not change significantly as it moves between the optional pre-treatment station, the image forming station and the impression station(s). Additionally and alternatively, as shall be exemplified with the alternative architecture illustrated by FIG. 11 described below, the ink image and the intermediate transfer member may be subjected to a different temperature regimen at different stations. For example, in some embodiments wherein the belt of the invention may be used, the temperature on the outer surface of the intermediate transfer member at the image forming station can be in a range between 40° C. and 160° C., or between 60° C. and 90° C. In some embodiments, the belt may be submitted to additional heating in a range between 90° C. and 300° C., or between 150° C. and 250° C., to further dry the ink image, at a drying station. At the image impression station, the belt may sustain temperatures in a range between 80° C. and 220° C., or between 100° C. and 160° C. If it is desired to allow the transfer member to enter the image forming station at a temperature that would be compatible to the operative range of such station, the printing system may further comprise a cooling station to decrease the belt temperature to a range between 40° C. and 90° C.

To apply heat at different rates to the ink image carried by the surface of the transfer member, external heaters or energy sources (not shown) may be used to apply additional energy locally, for example prior to reaching the impression stations to render the ink residue tacky, prior to the image forming station to dry the optional pre-treatment agent and at the image forming station to start evaporating the carrier from the ink droplets as soon as possible after they impact the surface of the belt.

The external heaters may be, for example, hot gas or air blowers or radiant heaters schematically represented as 306 in FIG. 1 focusing, for example, infra red radiation onto the surface of the belt, which may attain temperatures in excess of 175° C., 190° C., 200° C., 210° C., or even 220° C.

In addition, the vapor formed by the evaporation of the ink carrier as a result of the aforementioned heating may be evacuated or removed from their region of formation in the vicinity of the intermediate transfer member by a suitable gas moving apparatus.

If the ink contains components sensitive to ultraviolet light then a UV source may be used to help cure the ink as it is being transported by the belt.

Substrate Transport Systems

Figure 2:
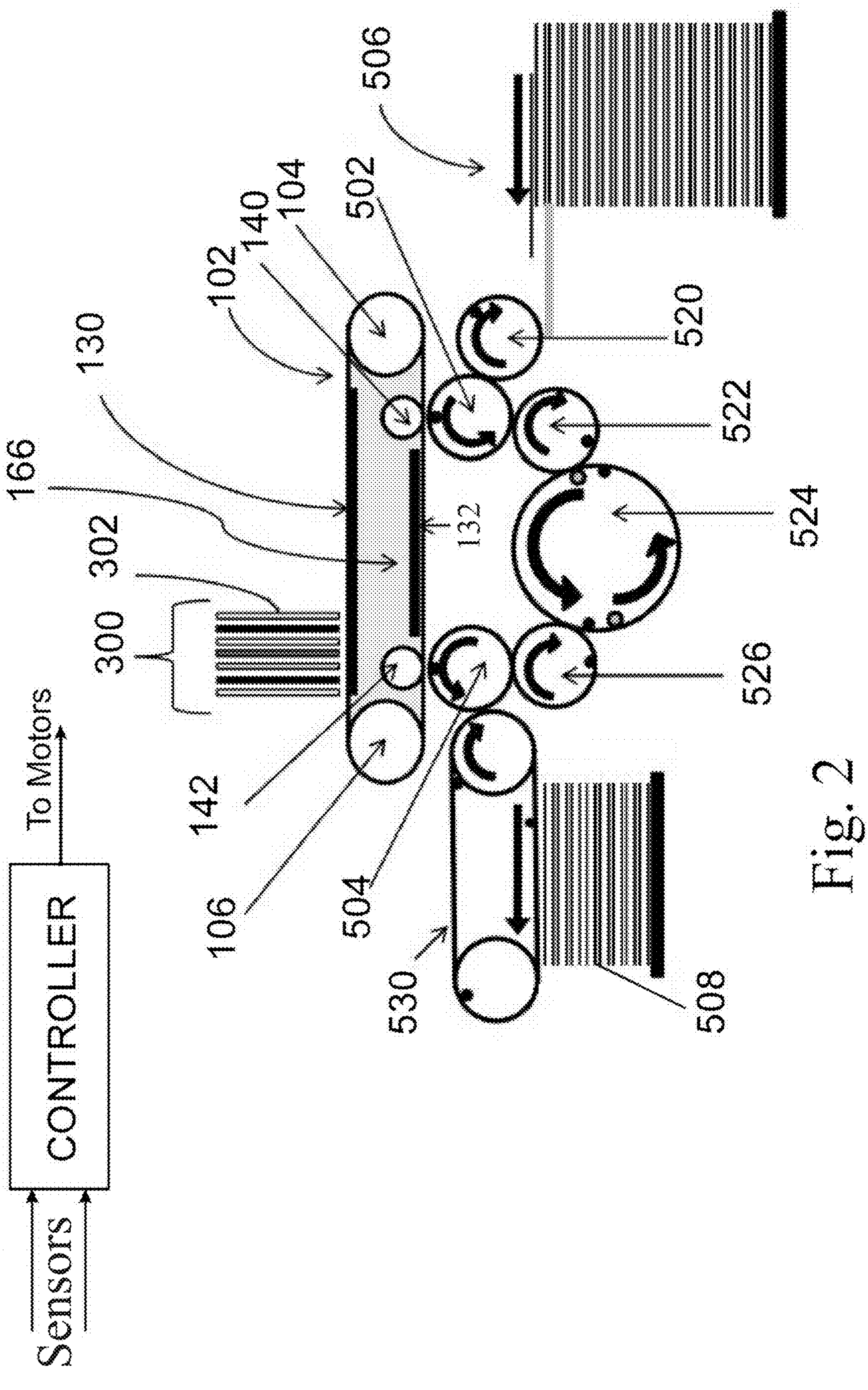
FIG. 2 is a schematic vertical section through the printing system of FIG. 1 in which the various components of the printing system are not drawn to scale.

The substrate transport system may be designed as in the case of the embodiment of FIGS. 1 and 2 to transport individual sheets of substrate to the impression stations or, as is shown in FIG. 5, to transport a continuous web of the substrate.

In the case of FIGS. 1 and 2, individual sheets are advanced, for example by a reciprocating arm, from the top of an input stack 506 to a first transport roller 520 that feeds the sheet to the impression cylinder 502 at the first impression station.

Though not shown in the drawings, but known per se, the various transport rollers and impression cylinders may incorporate grippers that are cam operated to open and close at appropriate times in synchronism with their rotation so as to clamp the leading edge of each sheet of substrate. In an embodiment of the invention, the tips of the grippers, at least of the impression cylinders 502 and 504, are designed not to project beyond the outer surface of the cylinders to avoid damaging the belt 102.

After an image has been impressed onto one side of a substrate sheet during passage between the impression cylinder 502 and the belt 102 applied thereon by pressure roller 140, the sheet is fed by a transport roller 522 to a perfecting cylinder 524 that has a circumference that is twice as large as the impression cylinders 502, 504. The leading edge of the sheet is transported by the perfecting cylinder past a transport roller 526, of which the grippers are timed to catch the trailing edge of the sheet carried by the perfecting cylinder and to feed the sheet to the second impression cylinder 504 to have a second image impressed onto its reverse side. The sheet, which has now had images printed onto both its sides, can be advanced by a belt conveyor 530 from the second impression cylinder 504 to the output stack 508. In one embodiment, the belt of conveyor 530 is constructed as detailed herein for a belt serving as intermediate transfer member.

As the images printed on the belt are always spaced from one another by a distance corresponding to the circumference of the impression cylinders, or half of it when the cylinder can accommodate two substrates (e.g. having two set of grippers), it is important for the distance between the two impression stations also to be equal to the circumference of the impression cylinders 502, 504 or a multiple of this distance. The length the individual images on the belt is of course dependent on the size of the substrate not on the size of the impression cylinder.

In the embodiment shown in FIG. 5, a web 560 of the substrate is drawn from a supply roll (not shown) and passes over a number of guide rollers 550 with fixed axes and stationary cylinders 551 that guide the web past the single impression cylinder 502 which forms a unique impression station.

Some of the rollers over which the web 560 passes do not have fixed axes. In particular, on the in-feed side of the web 560, a roller 552 is provided that can move vertically. By virtue of its weight alone, or if desired with the assistance of a spring acting on its axle, the roller 552 serves to maintain a constant tension in the web 560. If, for any reason, the supply roller offers temporary resistance, the roller 552 will rise and conversely the roller 552 will move down automatically to take up slack in the web drawn from the supply roll.

At the impression station, the web 560 is required to move at the same speed as the surface of the belt. As earlier explained, the images on the belt must be spaced apart by the circumference of the impression cylinder 502, and within this spacing it is necessary to be able to accommodate the length of belt within which no printing can take place on account of the possible presence of the seam. If the web 560 were therefore to be permanently engaged with the belt 102 at the impression station formed with impression cylinder 502, then much of the substrate lying between printed images would need to be wasted.

To mitigate this problem, there are provided, straddling the impression station, two so-called dancers 554 and 556, these being motorized rollers that are moved up and down in opposite directions in synchronism with one another. After an image has been impressed on the web, the pressure roller 140 is disengaged to allow the web 560 and the belt to move relative to one another. Immediately after disengagement, the dancer 554 is moved downwards at the same time as the dancer 556 is moved up. Though the remainder of the web continues to move forward at its normal speed, the movement of the dancers 554 and 556 has the effect of moving a short length of the web 560 backwards through the gap between the impression cylinder 502 and the belt 102 from which it is disengaged. This is done by taking up slack from the run of web following the impression station and transferring it to the run preceding the impression station. The motion of the dancers is then reversed to return them to their illustrated position so that the section of web at the impression station is again accelerated up to the speed of the belt.

The pressure roller 140 can now be re-engaged to impress the next image on the web but without leaving large blank areas between the images printed on the web.

The web transport system illustrated in FIG. 5 is only designed for printing on one side of the substrate. For double sided printing on a web, it is possible either to repeat the printing on the reverse side of the web after it has been wound onto a take-up roll or to reverse the web using suitably inclined rollers and to feed it through a second printing system arranged in series or side by side with the illustrated printing system.

Alternatively, if the width of the belt exceeds twice the width of the web, it is possible to use the two halves of the same belt and the same impression cylinder to print on the opposite sides of different sections of the web at the same time.

Figure 11:
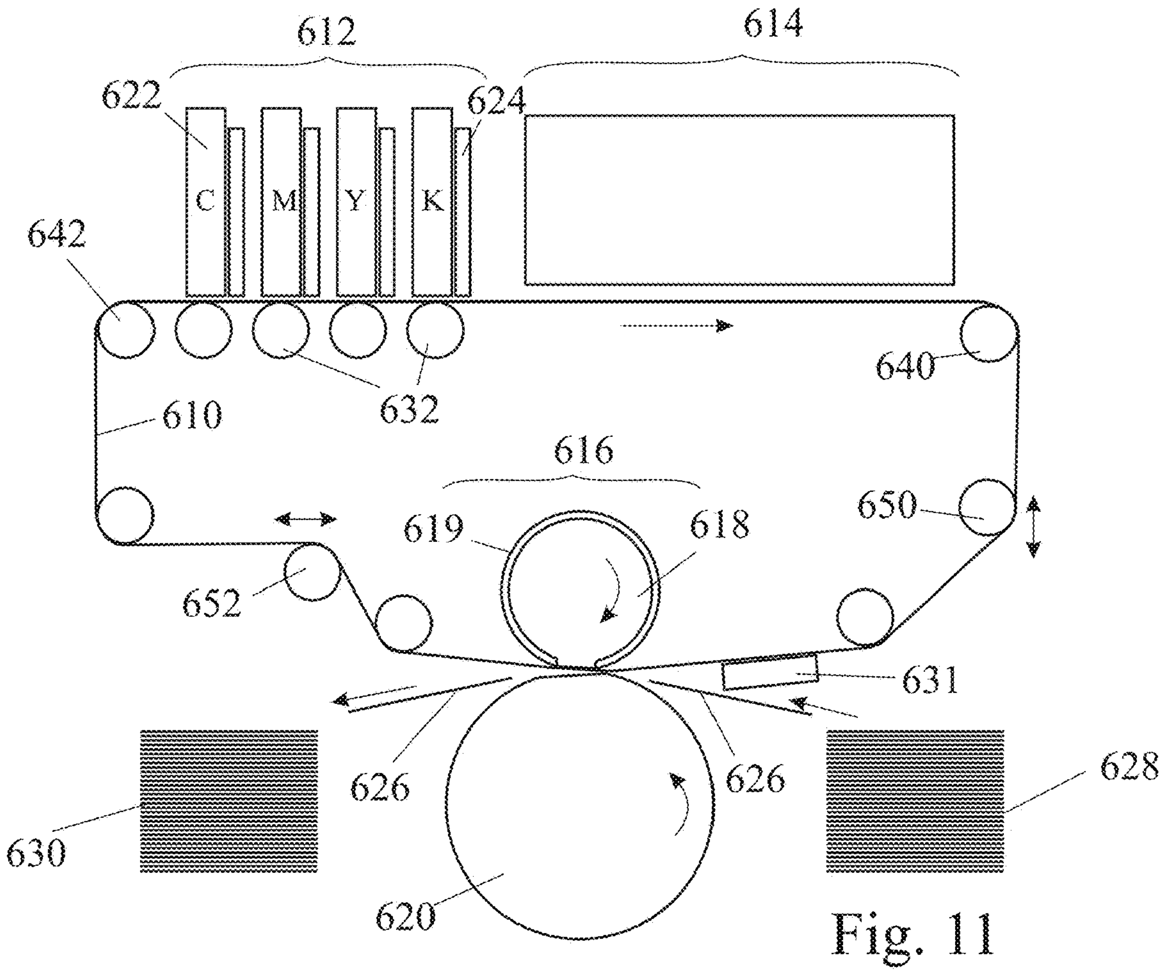
FIG. 11 is a schematic representation of a printing system operating on the same principle as the printing system of FIG. 1 to 5 but having an alternative architecture.

The printing system of FIG. 11 comprises an endless belt 610 that cycles through an image forming station 612, a drying station 614, and an impression station 616.

In the image forming station 612 four separate print bars 622 incorporating one or more print heads, that use inkjet technology, deposit ink droplets of different colors onto the surface of the belt 610. Though the illustrated embodiment has four print bars 622 each able to deposit one of the typical four different colors (namely Cyan (C), Magenta (M), Yellow (Y) and Black (K)), it is possible for the image forming station to have a different number of print bars and for the print bars to deposit different shades of the same color (e.g. various shades of grey including black) or for more two print bars or more to deposit is the same color (e.g. black). Following each print bar 622 in the image forming station, an intermediate drying system 624 is provided to blow hot gas (usually air) onto the surface of the belt 610 to dry the ink droplets partially. This hot gas flow assists in preventing blockage of the inkjet nozzles and also prevents the droplets of different color inks on the belt 610 from merging into one another. In the drying station 614, the ink droplets on the belt 610 are exposed to radiation and/or hot gas in order to dry the ink more thoroughly, driving off most, if not all, of the liquid carrier and leaving behind only a layer of resin and coloring agent which is heated to the point of being rendered tacky.

In the impression station 616, the belt 610 passes between an impression cylinder 620 and a pressure cylinder 618 that carries a compressible blanket 619. The length of the blanket 619 is equal to or greater than the maximum length of a sheet 626 of substrate on which printing is to take place. The impression cylinder 620 has twice the diameter of the pressure cylinder 618 and can support two sheets 626 of substrate at the same time. Sheets 626 of substrate are carried by a suitable transport mechanism (not shown in FIG. 11) from a supply stack 628 and passed through the nip between the impression cylinder 620 and the pressure cylinder 618. Within the nip, the surface of the belt 620 carrying the tacky ink image is pressed firmly by the blanket 619 on the pressure cylinder 618 against the substrate 626 so that the ink image is impressed onto the substrate and separated neatly from the surface of the belt. The substrate is then transported to an output stack 630. In some embodiments, a heater 631 may be provided shortly prior to the nip between the two cylinders 618 and 620 of the image impression station 616 to assist in rendering the ink film tacky, so as to facilitate transfer to the substrate.

In the embodiment of FIG. 11, the surface of the belt 610 used to transport the ink images forms part of a separate element from the thick blanket 619 that is needed to press it against the substrate sheets 626. In FIG. 11, this surface is formed on a flexible thin inextensible belt 610 that is preferably fiber reinforced for increased tensile strength in its lengthwise dimension (e.g. with high performance fibers).

Figure 12:
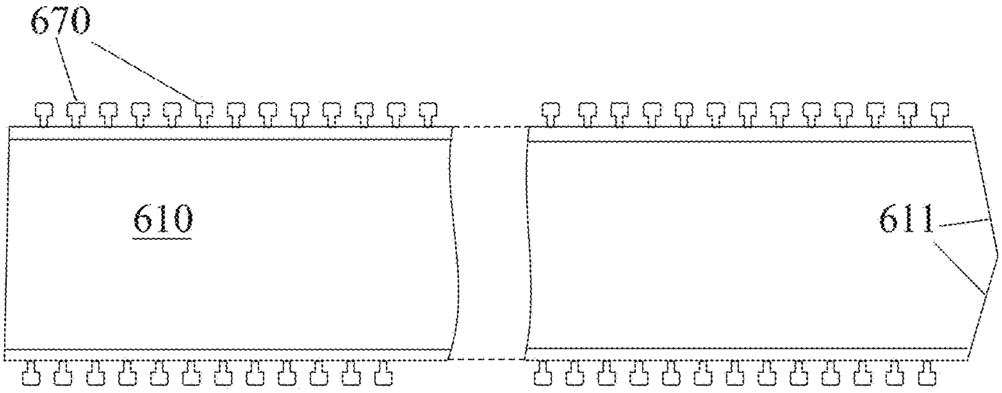
FIG. 12 is generally similar to FIG. 6 or 7 and shows an alternative design of the strip from which the belt used in FIGS. 1 to 5 or in FIG. 11 is made.
Figure 13:
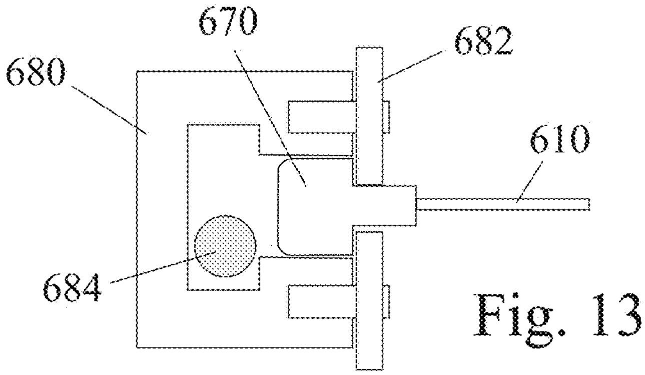
FIG. 13 shows a section through a track for receiving the formations of the belt used in the embodiment of FIGS. 1 to 5 or in FIG. 11.

As shown schematically in FIGS. 12 and 13, as with the embodiment of FIGS. 1 to 5, the lateral edges of the belt 610 can be provided with formations in the form of spaced projections 670 which on each side are received in a respective guide channel 680 (shown in section in FIG. 13) in order to maintain the belt taut in its width ways dimension. The projections 670 may be the teeth of one half of a zip fastener that is sewn or otherwise secured to the lateral edge of the belt. As an alternative to spaced projections, a continuous flexible bead of greater thickness than the belt 610 may once again be provided along each side. To reduce friction, the guide channel 680 may, as shown in FIG. 13, have rolling bearing elements 682 to retain the projections 670 or the beads within the channel 680.

Guide channels 680 in the image forming station ensure accurate placement of the ink droplets on the belt 610. Likewise, guide channels in the impression station 616 ensure accurate placement of the image on the substrate. In other areas, such as within the drying station 614, lateral guide channels are desirable but less important. In regions where the belt 610 has slack, no guide channels are present.

It is important for the belt 610 to move with constant speed through the image forming station 612 as any hesitation or vibration will affect the registration of the ink droplets of different colors. To assist in guiding the belt smoothly, friction is reduced by passing the belt over rollers 632 adjacent each printing bar 622 instead of sliding the belt over stationary guide plates. The rollers 632 need not be precisely aligned with their respective print bars 622. They may be located slightly (e.g. a few millimeters) downstream of the print head jetting location. The frictional forces maintain the belt taut and substantially parallel to print bars. The underside of the belt may therefore have high frictional properties as it is only ever in rolling contact with all the surfaces on which it is guided. The lateral tension applied by the guide channels need only be sufficient to maintain the belt 610 flat and in contact with rollers 632 as it passes beneath the print bars 622. Aside from the inextensible reinforcement/support layer, the hydrophobic release surface layer and high friction underside, the belt 610 is not required to serve any other function. It may therefore be a thin light inexpensive belt that is easy to remove and replace, should it become worn.

It is possible for the belt 610 to be seamless, that is it to say without discontinuities anywhere along its length. Such a belt would considerably simplify the control of the printing system as it may be operated at all times to run at the same surface velocity as the circumferential velocity of the two cylinders 618 and 620 of the impression station. Any stretching of the belt with ageing would not affect the performance of the printing system and would merely require the taking up of more slack by tensioning rollers 650 and 652, detailed below.

It is however less costly to form the belt as an initially flat strip of which the opposite ends are secured to one another, for example by a zip fastener or possibly by a strip of hook and loop tape or possibly by soldering the edges together or possibly by using tape (e.g. Kapton® tape, RTV liquid adhesives or PTFE thermoplastic adhesives with a connective strip overlapping both edges of the strip). In such a construction of the belt, it is essential to ensure that printing does not take place on the seam and that the seam is not flattened against the substrate 626 in the impression station 616.

The impression and pressure cylinders 618 and 620 of the impression station 616 may be constructed in the same manner as the blanket and impression cylinders of a conventional offset litho press. In such cylinders, there is a circumferential discontinuity in the surface of the pressure cylinder 618 in the region where the two ends of the blanket 619 are clamped. There may also be discontinuities in the surface of the impression cylinder, for instance to accommodate grippers that serve to grip the leading edges of the substrate sheets to help transport them through the nip. In the illustrated embodiments of the invention, the impression cylinder circumference is twice that of the compressible blanket cylinder and the impression cylinder has two sets of grippers, so that the discontinuities line up twice every cycle for the impression cylinder. Alternatively the printing system may not require grippers (e.g. for web substrate), in which case the impression cylinder may have a continuous surface devoid of recess.

If the belt 610 has a seam, then it is necessary to ensure that the seam always coincides in time with the gap between the cylinders of the impression station 616. For this reason, it is desirable for the length of the belt 610 to be equal to a whole number multiple of the circumference of the pressure cylinder 618.

However, even if the belt has such a length when new, its length may change during use, for example with fatigue or temperature, and should that occur the phase of the seam during its passage through the nip will change every cycle.

To compensate for such change in the length of the belt 610, it may be driven at a slightly different speed from the cylinders of the impression station 616. The belt 610 is driven by two separately powered rollers 640 and 642. By applying different torques through the rollers 640 and 642 driving the belt, the run of the belt passing through the image forming station is maintained under controlled tension. The speed of the two rollers 640 and 642 can be set to be different from the surface velocity of the cylinders 618 and 620 of the impression station 616.

Two powered tensioning rollers, or dancers, 650 and 652 are provided one on each side of the nip between the cylinders of the impression station. These two dancers 650, 652 are used to control the length of slack in the belt 610 before and after the nip and their movement is schematically represented by double sided arrows adjacent the respective dancers.

FIGS. 12 and 13 additionally show details that assist in the installation of a replacement belt 610. The leading edge 611 of the strip from which the belt is formed may be cut an angle to facilitate its feeding through various narrow gaps such as the nip of the impression station 616 or the gap between the print bars 622 and the rollers 632. It is furthermore possible to stiffen the leading edge 611 to allow the belt to be gripped and advanced more easily. The leading edge may later be trimmed when it is secured to the trailing end to form a continuous loop. Alternatively, the leading edge may be a device reversibly attached to one end of the strip during installation of the belt and removed before securing the ends.

FIG. 13 shows a loop of cable 684 that is permanently housed in one or both of the tracks 680. It is possible to anchor the leading end of the replacement belt to the cable 684 then to use the cable to feed the strip through the various tracks 684. During normal use, the cable(s) 684 remains stationary in the tracks 680 and is only rotated during installation of a new belt 610.

The contents of all of the above mentioned applications of the Applicant are incorporated by reference as if fully set forth herein.

The present invention has been described using detailed descriptions of embodiments thereof that are provided by way of example and are not intended to limit the scope of the invention. The described embodiments comprise different features, not all of which are required in all embodiments of the invention. Some embodiments of the present invention utilize only some of the features or possible combinations of the features. Variations of embodiments of the present invention that are described and embodiments of the present invention comprising different combinations of features noted in the described embodiments will occur to persons skilled in the art to which the invention pertains.

In the description and claims of the present disclosure, each of the verbs, "comprise" "include" and "have", and conjugates thereof, are used to indicate that the object or objects of the verb are not necessarily a complete listing of members, components, elements or parts of the subject or subjects of the verb. As used herein, the singular form "a", "an" and "the" include plural references unless the context clearly dictates otherwise. For example, the term "a formation" or "at least one formation" may include a plurality of formations.

The invention claimed is:

1. A method of installing a belt to a printing system comprising an image forming system at which drops of ink are deposited to form an image, an impression station at which the formed ink-images are transferred to substrate, and lateral tracks, the method comprising:

a. providing a flexible belt comprising an elongate strip wherein formations are provided along the sides of the elongate strip;
b. feeding the strip through the lateral tracks; and
c. attaching the ends of the strip to each other to form the endless loop, wherein after steps (a)-(c) are carried out: (i) the formations that are provided on each side of the elongate strip engage the lateral tracks in such a manner as to place the belt under width ways tension and to constrain the belt to follow a continuous path defined by the lateral tracks, and (ii) the belt has a degree of elasticity in a width ways direction that is greater than the elasticity of the belt in a longitudinal direction.

2. The method of claim 1 each of the lateral guiding tracks is of suitable cross-section to slidably retain the formations on the sides of the belt.

3. The method of claim 1 wherein the printing system comprises rollers around which, after steps (a)-(c) are carried out, the endless loop is mounted.

4. The method of claim 3 wherein said rollers are adjacent to print bars of the image forming station that overlie the belt.

5. The method of claim 4 wherein, after steps (a)-(c) are carried out, the adjacent rollers lie in a plane offset from a flat plane passing through the two tracks such that lateral tension in the belt, resulting from engagement of the formations in the tracks, serves to flatten the belt against the surfaces of the rollers.

6. The method of claim 1 wherein the belt is mounted over rollers, and wherein the ends of the elongate strip are slightly inclined relative to the lateral direction, so that after steps (a)-(c) are carried out and the slightly-inclined ends are attached to each other to form the endless loop, a presence of the slightly-inclined ends serves to avoid or mitigate a sudden change in tension as the belt passes circulates around the rollers.

* * * * *